(12) United States Patent
Makki et al.

(10) Patent No.: US 8,099,947 B2
(45) Date of Patent: Jan. 24, 2012

(54) CONTROL AND DIAGNOSTIC APPROACH FOR EMISSION CONTROL DEVICE

(75) Inventors: Imad Hassan Makki, Dearborn Heights, MI (US); James Michael Kerns, Trenton, MI (US); Michael James Uhrich, West Bloomfield, MI (US); Michael Igor Kluzner, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1302 days.

(21) Appl. No.: 11/742,806

(22) Filed: May 1, 2007

(65) Prior Publication Data
US 2007/0256406 A1 Nov. 8, 2007

Related U.S. Application Data

(60) Provisional application No. 60/746,263, filed on May 3, 2006.

(51) Int. Cl.
*F01N 3/00* (2006.01)
(52) U.S. Cl. ............. 60/277; 60/274; 60/276; 60/285
(58) Field of Classification Search ............... 60/274, 60/276, 277, 285, 297, 302
See application file for complete search history.

(56) References Cited

U.S. PATENT DOCUMENTS

| | | | |
|---|---|---|---|
| 5,357,751 A | 10/1994 | Orzel | |
| 5,899,062 A | 5/1999 | Jerger et al. | |
| 5,937,638 A * | 8/1999 | Akazaki et al. | 60/274 |
| 5,974,786 A | 11/1999 | Kluzner et al. | |
| 6,018,944 A | 2/2000 | Davey et al. | |
| 6,116,021 A * | 9/2000 | Schumacher et al. | 60/274 |
| 6,345,498 B2 * | 2/2002 | Yonekura et al. | 60/277 |
| 6,349,540 B1 | 2/2002 | Nakayama et al. | |
| 6,550,237 B1 | 4/2003 | Adamczyk et al. | |
| 6,769,243 B2 | 8/2004 | Lewis et al. | |
| 7,000,379 B2 | 2/2006 | Makki et al. | |
| 7,168,237 B2 * | 1/2007 | Ueda et al. | 60/277 |
| 7,249,453 B2 * | 7/2007 | Saito et al. | 60/277 |
| 7,596,941 B2 * | 10/2009 | Takubo | 60/285 |

* cited by examiner

*Primary Examiner* — Tu Nguyen
(74) *Attorney, Agent, or Firm* — Julia Voutyras; Alleman Hall McCoy Russell & Tuttle LLP (57) ABSTRACT

A system and method for engine control and diagnostics are described. In one example, a catalyst is modeled as a non-linear integrator. The method may improve engine air-fuel diagnostics.

20 Claims, 5 Drawing Sheets

CONTROL AND DIAGNOSTIC APPROACH FOR EMISSION CONTROL DEVICE

The present application claims priority to provisional application 60/746,263, filed May 3, 2006, the entire contents of which are incorporated herein by reference.

BACKGROUND AND SUMMARY

Various approaches are available for controlling air-fuel ratio of an internal combustion engine to reduce emissions. In one approach, a catalyst gain model and adaptive gain calibration are used to modify the control system action as the catalyst ages to reduce breakthrough of regulated emissions. Such an approach is described in U.S. Pat. No. 7,000,379.

However, the inventors herein have recognized an issue with such an approach. Specifically, under some conditions, the control system may be so accurate that even when catalyst operation degrades, the signals generated by available exhaust gas oxygen sensors may be indistinguishable from other noise.

As such in one approach, to perform catalyst diagnostics and/or to determine how the oxygen storage of the catalyst is changing as the system ages, a diagnostic monitor may override the air-fuel ratio control system. Specifically, the diagnostic monitor may intrusively schedule control system operation to increase the difference in oxygen (and/or reductant breakthrough (and thus, downstream air-fuel ratio sensor activity) so that a degraded catalyst can be more easily identified as compared to a sufficiently functioning catalyst. In one particular example, air-fuel ratio adjustment responsiveness to a sensor downstream of the monitored catalyst volume is temporarily increased from reduced settings used to improve air-fuel ratio control as the system ages.

In another approach, a system and method are described for controlling an internal combustion engine that include an inner feedback control loop to control the engine fuel/air (or air-fuel) ratio with feedback provided by a first exhaust gas sensor and an outer feedback control loop that modifies the fuel/air ratio reference provided to the inner feedback control loop based on feedback signals provided by the first exhaust gas sensor and a second exhaust gas sensor. The fuel/air ratio reference signal controller adapts to the oxygen storage capacity of the catalyst by modeling the catalyst as a nonlinear integrator with an unknown adaptive gain and estimating the catalyst gain based on the first and second exhaust gas sensor signals. An adaptive controller gain factor is then determined based on the estimated catalyst gain and is used to determine the fuel/air ratio reference signal. During catalyst diagnostic conditions, the effects of the adaptive controller are reduced or eliminated to enable improved signal to noise ratio in determining degradation due to catalyst degradation.

Such an approach enables adaptation of the fuel/air ratio controller to the changing oxygen storage capacity of the catalyst. The engine controller modulates the fuel/air ratio between limits set by a relay block within the outer loop controller as adjusted by an adaptive gain factor based on the estimated catalyst gain. The relay block switches between predetermined offset values of the fuel/air ratio reference depending on the sign of the error between the second exhaust gas sensor and its associated reference value, with the resulting fuel/air ratio reference provided to the inner loop controller. However, during catalyst diagnostic conditions, the adaptive gain factor can revert to a predetermined and fixed value (or fixed range of values) to thereby enable repeatable testing of the catalyst performance. In other words, as the catalyst ages, the adaptive control may effectively decrease the air-fuel ratio feedback gain relative to the downstream sensor (otherwise the system may be over-responsive to errors) to better match the aging catalyst. Then, during diagnostics, the gain may be temporarily increased to provide a higher signal to noise reading on the downstream sensor which can be used to provide a more accurate indicate of catalyst degradation.

Various advantages may be achieved by such an approach. For example, the present invention may provide a more robust engine controller that adapts to changing catalyst dynamics on-line, and thereby allows increased robustness to catalyst degradation. Further, to account for the negative impacts of such robustness on catalyst diagnosis, and intrusive approach may be used where control gains are temporarily increased to provide repeatable and accurate catalyst diagnostics, where the diagnostics are based on the downstream air-fuel ratio sensor.

DETAILED DESCRIPTION

The present application relates to a control strategy for controlling and monitoring operation of an internal combustion engine to effectively manage catalyst conversion efficiency under various engine, vehicle, and catalyst operating conditions. As will be appreciated, the various controllers referred to may be implemented by software, code, or instructions executed by a microprocessor based engine, vehicle, and/or powertrain controller.

Embodiments use an inner feedback control loop for fuel/air ratio control and an outer feedback control loop that provides an fuel/air ratio reference value to the inner feedback control loop. The outer loop includes an adaptive controller that adapts to the estimated oxygen storage capacity of the catalyst, exerting more control effort while the catalyst exhibits a large degree of oxygen storage, while reducing control effort under higher engine loads or after the catalyst has aged significantly and exhibits less oxygen storage capacity. The estimated catalyst gain determined on-line in real-time by the engine controller may also be used to determine the catalyst performance. Further, the gain may be modified to a predetermined value during diagnostics, so that when less oxygen storage capacity has been indicated and the controller would otherwise reduce control effort, increased control effort responsive to the outer loop may be provided during the diagnosis to increase signal to noise ratio of the downstream sensor thereby enabling more accurate detection of catalyst degradation for meeting regulated emissions.

Figure 1:
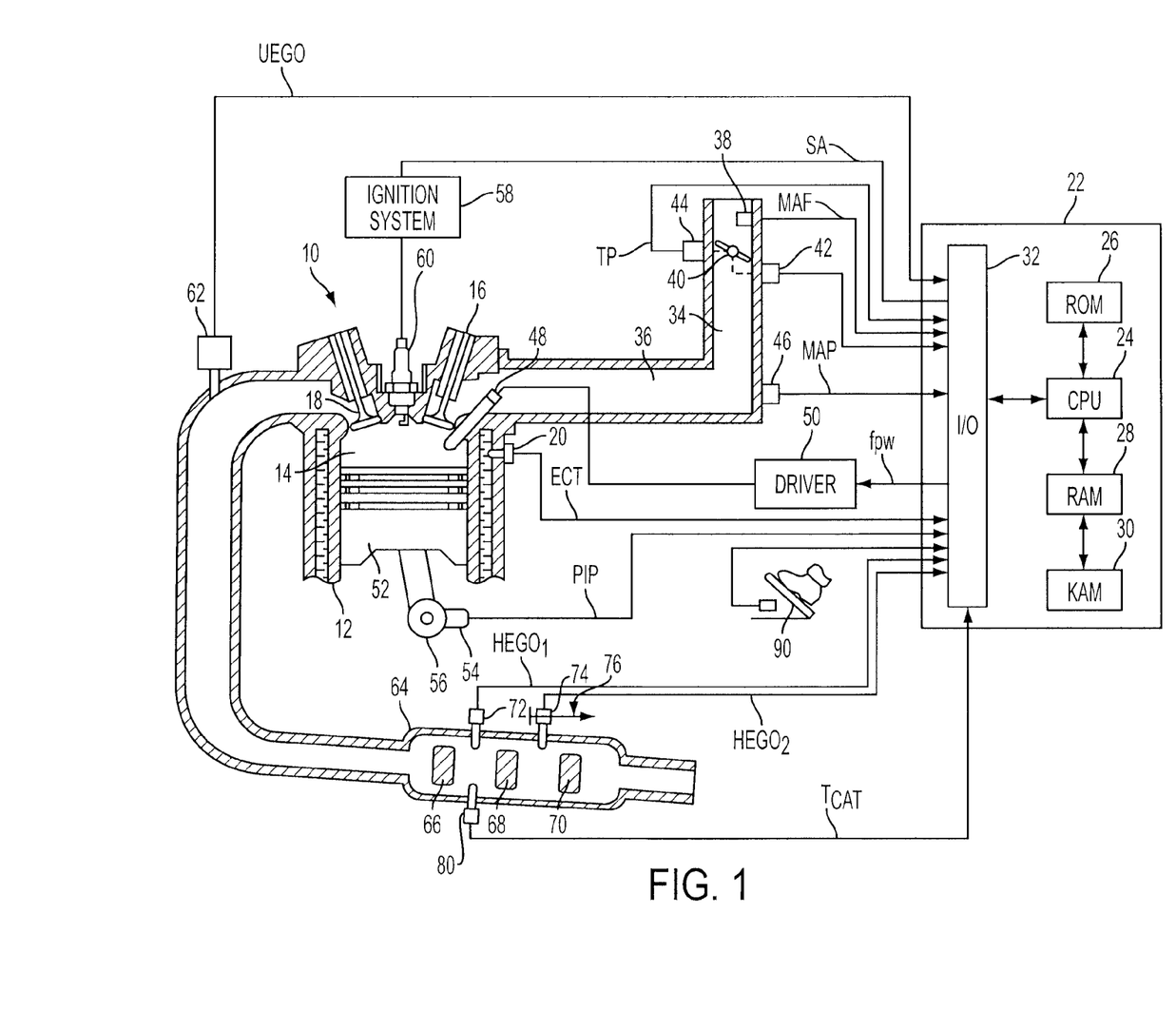
FIG. 1 is a block diagram of a representative embodiment of a system or method for controlling an internal combustion engine.

System 10 includes an internal combustion engine having a plurality of cylinders, represented by cylinder 12, having corresponding combustion chambers 14. System 10 may include various sensors and actuators to effect control of the engine. One or more sensors or actuators may be provided for each cylinder 12, or a single sensor or actuator may be provided for the engine. For example, each cylinder 12 may include four actuators that operate intake valves 16 and exhaust valves 18. However, the engine may include only a single engine coolant temperature sensor 20.

System 10 may include a controller 22 having a microprocessor 24 in communication with various computer-readable storage media. The computer readable storage media may include a read-only memory (ROM) 26, a random-access memory (RAM) 28, and a keep-alive memory (KAM) 30. The computer-readable storage media may be implemented using any of a number of known temporary and/or persistent memory devices such as PROMs, EPROMs, EEPROMs, flash memory, or any other electric, magnetic, optical or combination memory capable of storing data, code, instructions, calibration information, operating variables, and the like used by microprocessor 24 in controlling the engine. Microprocessor 24 communicates with the various sensors and actuators via an input/output (I/O) interface 32.

In operation, air passes through intake 34 where it may be distributed to the plurality of cylinders via a discrete or integrated intake manifold, indicated generally by reference numeral 36. System 10 may include a mass airflow sensor 38 that provides a corresponding signal (MAF) to controller 22 indicative of the mass airflow. A throttle valve 40 is used to modulate the airflow through intake 34. Throttle valve 40 may be electronically controlled by an appropriate actuator 42 based on a corresponding throttle position signal generated by controller 22. The throttle position signal may be generated in response to a corresponding engine output or torque requested by an operator via accelerator pedal 90 and current engine and/or vehicle operating conditions. A throttle position sensor 44 provides a feedback signal (TP) to controller 22 indicative of the actual position of throttle valve 40 to implement closed loop control of throttle valve 40.

A manifold absolute pressure sensor 46 is used to provide a signal (MAP) indicative of the manifold pressure to controller 22. Air passing through intake manifold 36 enters combustion chamber 14 through appropriate control of one or more intake valves 16. For variable cam timing applications, intake valves 16 and exhaust valves 18 may be controlled directly or indirectly by controller 22 using electromagnetic actuators or a variable cam timing (VCT) device, for example. Alternatively, intake valves 16 and exhaust valves 18 may be controlled using a conventional camshaft arrangement (not shown). A fuel injector 48 injects an appropriate quantity of fuel in one or more injection events for the current operating mode based on a signal (FPW) generated by an fuel/air ratio controller implemented by controller 22, which is then processed by driver 50. Fuel signal (FPW) is controlled to provide a desired fuel/air ratio within combustion chamber 14 as described in greater detail below.

As illustrated in FIG. 1, fuel injector 48 injects an appropriate quantity of fuel in one or more injections directly into combustion chamber 14, or into an intake port for port-injected applications. Control of the fuel injection events may be based on the position of piston 52 within cylinder 12. Position information is acquired by an appropriate sensor 54, which provides a position signal (PIP) indicative of rotational position of crankshaft 56.

At the appropriate time during the combustion cycle, controller 22 generates a spark signal (SA) that is processed by ignition system 58 to control spark plug 60 and initiate combustion within chamber 14. Controller 22 (or a conventional camshaft) controls one or more exhaust valves 18 to exhaust the combusted fuel/air mixture through an exhaust manifold. An exhaust gas oxygen sensor 62, which may be capable of providing a signal proportional to the amount of oxygen in the exhaust gas, such as a universal exhaust gas oxygen sensor (UEGO), for example, provides a signal (UEGO) indicative of the oxygen content of the feedgas to controller 22. This signal may be used to adjust the fuel/air ratio, or control the operating mode of one or more cylinders, for example, as described in greater detail below. The exhaust gas is passed through an integrated or discrete exhaust manifold and one or more integrated or discrete catalysts represented by catalyst 64 before being exhausted to atmosphere. One or more of the integrated or discrete catalysts may be three-way catalysts (TWC).

As shown in FIG. 1, each catalyst 64 may include one or more catalyst elements or bricks 66, 68, and 70. While each of the catalyst elements 66, 68, and 70 are illustrated as being contained within a single catalytic device 64, one or more of the catalyst elements may be contained in separate housings or devices depending upon the particular application. For example, a close-coupled or fast light-off catalyst may include a housing and a single catalyst element positioned as near to one or more exhaust ports as packaging considerations allow. Additional catalyst elements or bricks may be contained in one or more downstream housings or devices, such as an under-body device. In addition, the various cylinders 12 of engine 10 may be grouped in one or more banks each having two or more associated cylinders that share a particular exhaust stream such that each exhaust stream or bank has associated catalyst(s) and corresponding exhaust gas sensors. The system may be used in a variety of system configurations relative to positioning of one or more catalyst elements and corresponding exhaust gas sensors.

In one embodiment, a secondary exhaust gas sensor 72 is positioned downstream relative to first exhaust gas sensor 62 and at least one catalyst element 66 (or a portion thereof). For example, for applications employing a close-coupled catalyst, sensor 72 may be positioned downstream of the close-coupled catalyst and upstream of an under-body catalyst. Alternatively, sensor 72 may be positioned downstream of the first or second catalyst elements in a multi-element (multiple brick) catalyst as representatively illustrated in FIG. 1. Secondary exhaust gas sensor 72 provides a signal indicative of a relative fuel/air ratio by detecting excess oxygen in the exhaust stream. Sensor 72 may be a heated exhaust gas oxygen sensor (HEGO) that provides a corresponding signal HEGO1 used by controller 22 for feedback control in an attempt to maintain a predetermined sensor voltage, indicative of a desired catalyst performance as described in greater detail below.

In an alternative embodiment, a third exhaust gas sensor 74 is positioned downstream relative to the second exhaust gas sensor 72 and one or more additional catalyst elements 68, 70. Potential positioning of third sensor 74 is indicated generally by arrow and line 76. Third exhaust gas sensor 74 may also be a HEGO sensor that provides a corresponding signal HEGO.2 to controller 22 for use in monitoring performance of catalyst 64 and/or controlling engine fuel/air ratio as described in greater detail below.

As also shown in FIG. 1, a catalyst temperature sensor 80 may be provided to provide a signal TCAT corresponding to current catalyst temperature to controller 22 for use in controlling engine 10 and/or monitoring performance of catalyst 64. Alternatively, catalyst temperature may be estimated or inferred from various other engine and/or vehicle operating parameters as known in the art.

As illustrated and described in greater detail below, controller 22 includes an inner feedback control loop to control the engine fuel/air ratio by generating an appropriate fuel command (fpw). A feedback signal (UEGO) for the inner control loop is provided to controller 22 by exhaust gas sensor 62. An outer feedback control loop also implemented by controller 22 is used to generate an fuel/air ratio reference signal provided to the inner feedback control loop with feedback signals provided by exhaust gas sensor 62 and exhaust gas sensor 72. In one embodiment, the outer loop controller (also referred to as an fuel/air ratio reference signal controller) uses feedback signals from exhaust gas sensors 62, 72, and 74 to generate an appropriate fuel/air ratio reference signal. The fuel/air ratio reference signal controller implemented by controller 22 adapts to the oxygen storage capacity of catalyst 64 by modeling the catalyst as an integrator with an unknown gain and estimating the catalyst gain based on the feedback signals HEGO and UEGO provided by sensors 72 and 62, respectively. An adaptive controller gain factor is then determined based on the estimated catalyst gain and is then used by the outer loop controller to determine the fuel/air ratio reference signal provided to the inner loop controller. During diagnostics, the adaptive modification may be disabled, and a predetermine gain may be used to enhance catalyst monitoring.

Figure 2:
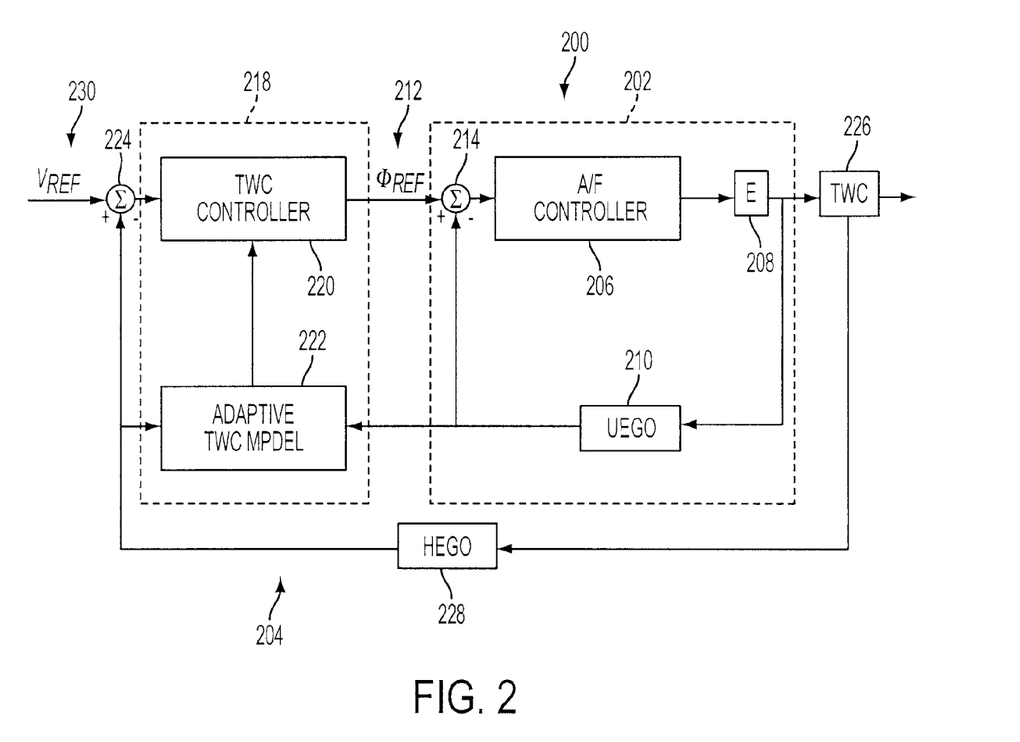
FIG. 2 is a block diagram illustrating inner and outer control loops for a representative engine control strategy.

FIG. 2 is a block diagram illustrating the inner and outer feedback control loops for a representative engine control strategy implemented by an engine controller, such as controller 22 (FIG. 1) according to one embodiment. Controller 200 includes an inner feedback control loop 202 and an outer feedback control loop indicated generally by reference numeral 204. Inner loop 202 includes an fuel/air ratio controller 206 that is a proportional-integral-derivative (PID) controller that generates an appropriate fuel command provided to the injectors of engine 208. UEGO sensor 210 provides a feedback signal proportional to the oxygen content of the feedgas or engine exhaust between the engine and the three-way catalyst (TWC) 226. The feedback signal is combined with an fuel/air ratio reference signal ΦREF) 212 generated by outer feedback control loop 204 at block 214. The error or difference signal provided by block 214 is then used by controller 206 to adjust the fuel command so that the actual fuel/air ratio within engine 208 approaches the desired fuel/air ratio.

Inner feedback control loop 202 was designed using a traditional control system design approach. After specifying the transfer function of a representative engine based on the operating conditions and frequency range of interest, the A/F controller characteristics were specified. Loop shaping was used to modify the magnitude and phase of the frequency response to provide a desired performance. The inventors herein recognized that the bandwidth of the engine increases with both speed and load such that engine idle conditions are generally the worst-case dynamics from a robustness standpoint. Therefore, the dynamics from the fuel pulse width (fpw) command provided to engine 208 to UEGO sensor 210 under engine idle operating conditions provide the worst-case stability margins throughout the engine operating range. The specifications for A/F controller 206 can therefore be determined from the transfer function estimate at idle while providing stability throughout the engine operating range.

Outer feedback control loop 204 includes an fuel/air ratio reference controller, indicated generally by reference numeral 218, that generates an fuel/air ratio reference signal 212 supplied to inner feedback control loop 202. Fuel/air ratio reference controller 218 includes a catalyst controller 220, for example a PID controller, and an adaptive catalyst model 222.

Catalyst controller 220 monitors and controls conversion efficiency of three-way catalyst 226 by modulating the fuel/air ratio reference signal 212 based on a feedback signal provided by HEGO sensor 228 and adaptive catalyst model 222. The feedback signal generated by HEGO sensor 228 is compared to a reference voltage (VREF) 230 to generate a difference or error signal at block 224. Controller 220 attempts to reduce the error or difference signal toward zero to maintain the voltage of HEGO sensor 228 close to its desired value as specified by reference voltage 230.

Adaptive catalyst model 222 determines online how the dynamics of the three-way catalyst 226 are changing. The model assumes that the dynamics from the feedgas as detected by UEGO sensor 210 to the position of HEGO sensor 228 positioned downstream relative to at least a portion of the catalyst can be modeled by an integrator with an unknown gain recognizing that the output signal of HEGO sensor 228 will be attenuated by the oxygen storage of catalyst 226, i.e.: Hego(t)=.intg.b*Uego(t)dt where Hego(t) represents the (output) signal generated by HEGO sensor 228, b represents the unknown catalyst gain, and UEGO(t) represents the (input) signal generated by UEGO sensor 210. As such, the catalyst gain, b, can be determined or estimated based on the input (UEGO) and output (HEGO) signals using any of a variety of known estimation techniques, such as recursive least squares, for example. In one embodiment, the catalyst gain is estimated by a gradient method using pre-filters to avoid differentiation of the measured sensor signals.

The catalyst gain inversely correlates with the current oxygen storage capacity of the catalyst. As such, a high value for the catalyst gain indicates low oxygen storage capacity of the portion of the catalyst 226 upstream of HEGO sensor 228. Estimating the catalyst gain online provides an indication of how the dynamics of the catalyst are changing and allows adaptation of the generated fuel/air ratio reference signal provided to the inner loop 202 in response to the changing catalyst dynamics. In general, more control effort can be used to control the state of catalyst 226 when catalyst 226 exhibits a large degree of oxygen storage, i.e. larger changes in the fuel/air ratio reference are used. When the degree of oxygen storage is lessened, such as under higher engine loads or after the catalyst has aged significantly, the control effort is decreased.

Figure 3:
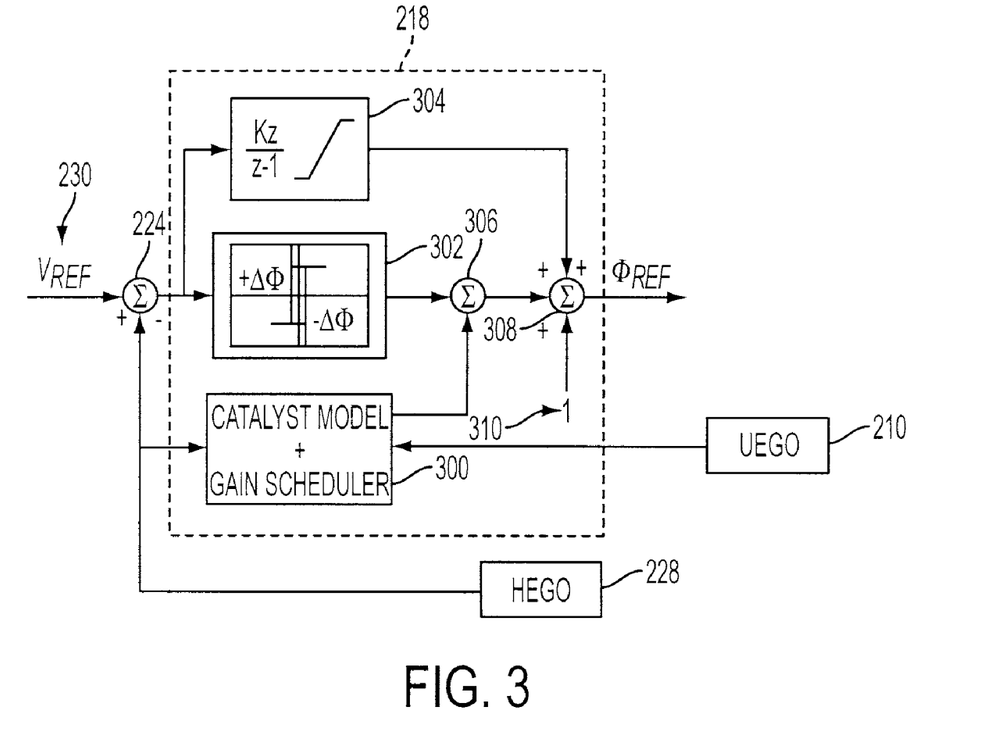
FIG. 3 is a block diagram illustrating a modified self-oscillating adaptive system (SOAS) for use in controlling an internal combustion engine.

FIG. 3 is a block diagram illustrating a modified self-oscillating adaptive system (SOAS) implementation of an fuel/air ratio reference signal controller according to one embodiment. The modified SOAS 218 includes a catalyst model and gain scheduler 300 that receives inputs from UEGO sensor 210 and at least one HEGO sensor 228. Block 300 determines a catalyst gain 310 using an appropriate catalyst model and then determines or schedules an adaptive gain based on the catalyst gain. In one embodiment, the adaptive gain is determined using a look-up table indexed or accessed by the estimated catalyst gain (see FIG. 4). The adaptive gain is multiplied by the output of a relay block 302 at block 306 with the result combined at block 308 with a feed-forward term that passes through a saturating integrator 304 with a small proportional gain so the integrator does not contribute to any limit cycle behavior. Relay block 302 generates a predetermined offset (+/−)N in fuel/air ratio reference depending on the sign of the error between the signal from HEGO 228 and reference voltage 230 as determined by block 224. In one embodiment, reference voltage 230 is 0.6 volts but may vary depending upon the particular type of exhaust gas sensor and the particular application. Relay block 302 may include appropriate hysteresis depending upon the particular application and implementation. Saturating integrator 304 is used to compensate for any constant offsets or errors in measurements of the feedgas fuel air ratio, such as those that may occur due to sensor bias or drift.

During intrusive catalyst diagnostics (See FIG. 5), a diagnostic reference voltage 230' and a predetermined diagnostic catalyst gain 310' may be used in place of reference voltage 230 and catalyst gain 310, respectively. In one example, predetermined catalyst gain 310' may be a fixed value, and a value different than that of reference voltage 230. Likewise, predetermined diagnostic catalyst gain 310' may be a fixed value, and a value different than gain 310. In one example, diagnostic catalyst gain 310' may be an initial (unadapted) value of gain 310. In another example, the values may be selected based on conditions of the system (such as the size of the catalyst, amount of precious metal loading, to provide greater air-fuel ratio swings for a larger catalyst as compared with a smaller catalyst).

As such, during diagnosis of the catalyst, block 300 is overridden, and predetermined diagnostic catalyst gain 310' is determined independent of the downstream sensor 228, and/or independent of the upstream sensor 210, and/or independent of the reference voltage. However, a predetermined diagnostic catalyst gain 310' may be used; the resulting air-fuel ratio adjustment is still responsive to the upstream and downstream sensors, as well as the reference voltage 230'.

The fuel/air ratio offset generated by relay block 302 is modified by the adaptive gain at block 306 before being combined with the feed-forward term and a target fuel/air ratio (a fuel/air ratio relative to a stoichiometric ratio, unity in this example) at block 308 to generate the fuel/air ratio reference signal (ΦREF) provided to the inner loop air/fuel ratio controller (206, FIG. 2). In general, this feedback control strategy modulates the fuel/air ratio between limits determined by relay block 302 as adjusted by the adaptive gain at block 306. The primary mechanism for downstream exhaust gas sensor feedback is the relay that switches to a predetermined offset in fuel/air ratio reference depending on the sign of the error or difference between the exhaust gas sensor reference, typically in the range of 0.6 to 0.7 volts, and the measured value.

Figure 4:
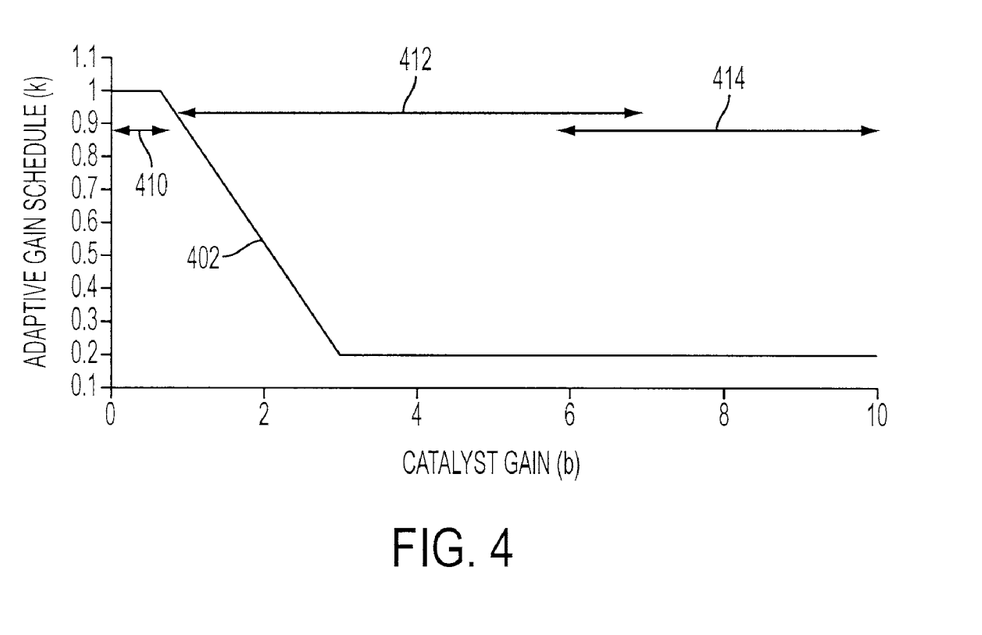
FIG. 4 is a graph of an adaptive gain factor as a function of an estimated catalyst gain that may be implemented as a look-up table for use in controlling an internal combustion engine.

FIG. 4 is a graph of an adaptive gain factor as a function of an estimated catalyst gain that may be implemented as a look-up table for use in controlling an internal combustion engine according to one embodiment. A function representing an estimated catalyst gain (b) and a corresponding adaptive gain factor (k) is plotted. This function is used to populate a look-up table with values as represented by line 402 that are stored in persistent memory for access by the engine controller in controlling the engine. As describe above, an estimated catalyst gain (b) is determined based on a catalyst model and inputs from the exhaust gas sensors. The estimated catalyst gain (b) is then used to access or index a look-up table to determine a corresponding adaptive gain factor (k) that is multiplied by the output of the relay block in the outer loop (fuel/air ratio reference) controller. As can be seen from the representative relationship between the catalyst gain (b) and adaptive gain factor (k) illustrated by line 402 of FIG. 4, the adaptive gain factor may not exceed unity and generally decreases with increasing catalyst gain to reduce the control effort via reducing the effect of the relay block (fuel/air ratio offset) when the catalyst is responding easily and quickly to changes in fuel/air ratio, i.e. when the catalyst is exhibiting reduced oxygen storage. Likewise, when the catalyst is exhibiting increased oxygen storage (corresponding to reduced catalyst gain), the adaptive gain factor is closer to or equal to unity.

Arrows 410, 412, and 414 of FIG. 4 indicate representative values for catalyst gain and corresponding adaptive gain for operating conditions that may result in varying catalyst oxygen storage. Region 410 may correspond to hot idling conditions with a green catalyst with region 412 corresponding to operation under higher engine speeds and/or loads. Region 414 would generally indicate a significantly aged catalyst.

Figure 5:
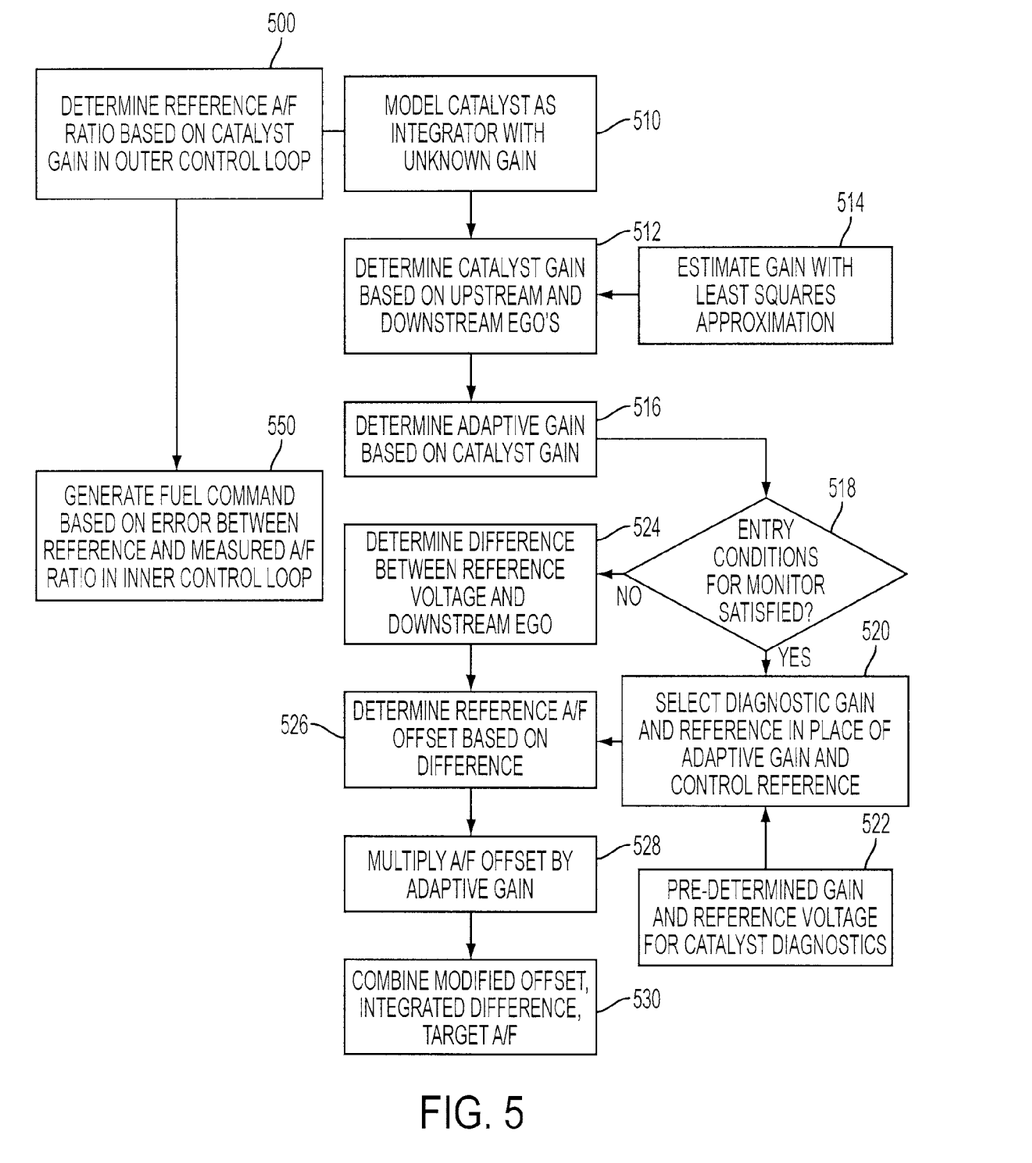
FIG. 5 is a flow chart illustrating operation of a system or method for controlling and diagnosing an internal combustion engine.

FIG. 5 is a flow chart illustrating operation of a system or method for controlling an internal combustion engine according to one embodiment The flow chart illustrates operation of representative embodiments of a system and method for controlling and monitoring an internal combustion engine. The diagrams and flow charts represent any of a number of known processing strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed. Similarly, the order of processing is not necessarily required to achieve the objects, features, and advantages described herein, but is provided for ease of illustration and description. The control logic illustrated may be implemented in software executed by a microprocessor-based vehicle, engine, and/or powertrain controller, such as controller 22 (FIG. 1). Of course, the control logic may be implemented in software, hardware, or a combination of software and hardware depending upon the particular application. When implemented in software, the control logic may be provided in one or more computer-readable storage media having stored data representing code or instructions executed by a computer to monitor and control the engine. The computer-readable storage media may be any of a number of known physical devices which utilize electric, magnetic, optical and/or combination storage to keep executable instructions and associated calibration information, operating variables, and the like.

As represented by block 500 of FIG. 8, a reference air/fuel (A/F) ratio is determined based on a catalyst gain in an outer control loop. The catalyst may be modeled as an integrator with an unknown gain as represented by block 510. The catalyst gain may be determined based on signals provided by an upstream exhaust gas oxygen (EGO) sensor that detects feedgas oxygen, and a downstream EGO that detects oxygen downstream of the catalyst as represented by block 512. The catalyst gain may be determined using any of a number of known estimation techniques, including a polynomial approximation such as a least squares approximation as represented by block 514.

An adaptive gain factor is determined based on the estimated catalyst gain as indicated by block 516. In one embodiment, the adaptive gain is stored in a look-up table referenced or indexed by the catalyst gain with values ranging between about zero and unity. However, if entry conditions for catalyst monitoring are satisfied (when certain rpm, load and engine air mass operating conditions at normal vehicle speeds have been met) in block 516, the catalyst gain is set to a predetermine catalyst gain for use during the diagnostic monitoring as represented by block 518. In one example, a predetermined reference voltage and catalyst gain may be provided by block 520. The values may be predetermined fixed values, such as an initial, un-adapted, control gain and reference voltage. The routine continues to 526 from 520.

If the answer to 518 is no, the signal from the downstream EGO is compared to a reference voltage to determine a difference or control error as represented by block 524. In one embodiment, the reference voltage may vary between about 0.6 and 0.7 volts with the downstream sensor being a HEGO sensor, where the predetermined diagnostic reference voltage may be set at 0.45. An offset for the reference A/F ratio is then determined based on the difference or error as represented by block 526. In one embodiment, a relay block is used to select one of two values based on the sign of the error or sign of the difference. The offset is then multiplied by the adaptive gain as represented by block 528 to adapt the control effort to the current oxygen storage capacity of the catalyst (or to provide a repeatable test condition for catalyst diagnosis, during such diagnostic operation). The modified offset is then combined with the integral of the error or difference and a target air/fuel ratio to produce the reference air/fuel ratio as represented by block 530. In one embodiment, the integrator applied to the error or difference is limited to avoid integrator wind-up.

The reference A/F ratio determined by the outer control loop as represented by block 500 may be provided to an inner control loop, which generates a fuel command based on an error between the reference A/F ratio and the measured A/F ratio as determined by the upstream EGO as represented by block 550.

During monitoring conditions when using the predetermine reference voltage and diagnostic catalyst gain, the downstream sensor may be monitored to determine catalyst performance. Specifically, when the engine air-fuel control operates with fixed adaptive feedback control, the downstream sensor signal is processed to obtain index of the signal length and then compared to a predetermined value to ascertain the storage capacity of the TWC, and thus to determine whether to indicate a degraded catalyst (e.g., via an indicator light) to the operator.

In this way, an active/intrusive monitor may be used for a fixed period when conditions are met, such as for a fixed time duration (e.g., 10 10-20 seconds), or a fixed number of engine cycles. The air-fuel control, as noted above, may deliver repeatable air-fuel control operation to the catalyst aftertreatment system across different tests and different vehicles. As the catalyst system ages, the downstream sensor increases in activity. If the monitored catalyst has sufficient oxygen storage, little activity is observed on the rear HO2S voltage signal. As catalyst oxygen storage degrades, the downstream sensor voltage signal activity increases. At the end of the test period, the controller can calculate a catalyst efficiency ratio based on the downstream sensor voltage signal length divided by a calibrated, low oxygen storage threshold catalyst downstream sensor voltage signal length.

In one particular embodiment, in order to assess catalyst oxygen storage, the catalyst monitor may be enabled during part-throttle, closed-loop fuel condition after the engine is warmed-up and inferred catalyst temperature is within limits. As noted above, when the monitor is enabled, the downstream sensor reference voltage, relay, and gain multiplier parameters may be fixed. Then, running time is accumulated in up to three different air mass regions or cells (although only one cell may be calibrated). While the catalyst monitoring entry conditions are being met, the downstream sensor signal voltage lengths are continually calculated. When the required total calibrated time has accumulated in each cell (air mass region), the total voltage signal voltage length of the downstream sensor is divided by a calibrated threshold rear HO2S signal voltage length to compute a catalyst efficiency ratio. A catalyst efficiency ratio near 0.0 indicates high oxygen storage capacity, hence high HC/NOx efficiency. However, a catalyst efficiency ratio near or greater than 1.0 may indicate low oxygen storage capacity and low HC/NOx efficiency such that an indication may be provided.

While various entry conditions may be provided, the system may also restrict operation of other engine control features when monitoring is carried out. For example, fuel vapor purging and/or learning of fuel injector offsets, mass air-flow errors, manifold pressure sensor errors, etc., may all be disabled. Further, such operations may be disabled for a predetermined period after monitoring is complete, in order to allow the control system to re-stabilize to the adapted control gain and set-point. Further, the monitoring may be enabled only once during a vehicle trip.

Such an approach may provide a robust engine controller that adapts to changing catalyst dynamics on-line, while also enabling accurate catalyst diagnosis. Further, it may be particularly suited to an upstream UEGO sensor/downstream HEGO sensor system since the upstream UEGO sensor provides an input used to control the engine out air fuel ratio without requiring a limit cycle that may result in increased downstream HEGO sensor activity as may be seen when an upstream HEGO sensor is used. Since the downstream HEGO sensor provides a sensitive indication of the air fuel ratio in the catalyst, using the sensor input during diagnostic operation minimizes the emission impact of the intrusive diagnostic mode.

While the above example shows a single path exhaust, the above control and diagnostic approach may be applied to various alternative exhaust system configurations, and various sensor configurations. Further, it should be appreciated that air-fuel ratio control system and control/diagnostic strategies described herein may be used in a variety of engine systems, including direct injection, variable cam timing, etc.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the fueling and diagnostic methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling operation of an engine having a catalyst in an exhaust system, the exhaust system further having an exhaust gas oxygen sensor upstream of the catalyst and an exhaust gas oxygen sensor downstream of the catalyst, the method comprising:

during a first operating mode in which catalyst diagnostics are not carried out, adjusting air-fuel ratio based on both the upstream and downstream exhaust gas oxygen sensors, where air-fuel ratio adjustment responsiveness to the downstream exhaust gas oxygen sensor is reduced as catalyst performance degrades; and during a second operating mode that includes catalyst diagnostics, adjusting air-fuel ratio based on at least the downstream exhaust gas oxygen sensor, where said air-fuel ratio adjustment responsiveness to the downstream exhaust gas oxygen sensor is temporarily increased from said reduction generated during the first operating mode.

2. The method of claim 1, where an amount of temporary increase in the air-fuel ratio adjustment responsiveness during the second operating mode is based on the reduced air-fuel ratio adjustment responsiveness during the first operating mode.

3. The method of claim 1, where during the second operating mode, a fixed control gain and sensor setpoint are repeatedly applied, and during the first operating mode, a variable control gain and sensor setpoint are applied.

4. The method of claim 3, wherein during the first operating mode, the variable control gain and setpoint are applied for fuel injection feedback adjustment based on the downstream exhaust gas oxygen sensor.

5. The method of claim 1, further comprising, during the second mode, processing the downstream exhaust gas oxygen sensor to provide an indication of degradation of the catalyst.

6. The method of claim 5, wherein said processing is independent of the upstream exhaust gas oxygen sensor.

7. A method of controlling operation of an engine having a catalyst in an exhaust system, the exhaust system further having an exhaust gas oxygen sensor upstream of the catalyst and an exhaust gas oxygen sensor downstream of the catalyst, the method comprising:
during a first operating mode in which catalyst diagnostics are not carried out, adjusting air-fuel ratio based on both the upstream and downstream exhaust gas oxygen sensors, where air-fuel ratio adjustment responsiveness to the downstream exhaust gas oxygen sensor is reduced as catalyst performance degrades, and where air-fuel ratio adjustment based on the upstream exhaust gas oxygen sensor is also based on the downstream exhaust gas oxygen sensor; and
during a second operating mode that includes catalyst diagnostics, adjusting air-fuel ratio based on the upstream and downstream exhaust gas oxygen sensors, where said air-fuel ratio adjustment responsiveness to the downstream exhaust gas oxygen sensor is temporarily increased from said reduction generated during the first operating mode.

8. The method of claim 7, where said responsiveness is adjusted by varying feedback gains, where a fixed gain is used during the second operating mode and an adjustable gain is used during the first operating mode.

9. The method of claim 8, where an amount of temporary increase in the air-fuel ratio adjustment responsiveness during the second operating mode is based on the reduced air-fuel ratio adjustment responsiveness during the first operating mode.

10. The method of claim 9, further comprising, during the second mode, processing the downstream exhaust gas oxygen sensor to provide an indication of degradation of the catalyst, said indication independent of output of the upstream exhaust gas oxygen sensor.

11. The method of claim 10, wherein the upstream exhaust gas oxygen sensor is a UEGO sensor and the downstream exhaust gas oxygen sensor is a HEGO sensor.

12. A system for controlling an engine, the system comprising:
a first exhaust gas sensor positioned downstream relative to the engine;
a catalyst positioned downstream relative to the first exhaust gas sensor;
a second exhaust gas sensor positioned downstream relative to the first exhaust gas sensor and downstream relative to at least a portion of the catalyst; and
a controller in communication with the first and second exhaust gas sensors, the controller having an inner feedback control loop to control air-fuel ratio of the engine with feedback provided via the first exhaust gas sensor and an outer feedback control loop that modifies a reference air-fuel ratio provided to the inner feedback control loop based on feedback provided via the first and second exhaust gas sensors wherein the reference air-fuel ratio adapts to oxygen storage capacity of the catalyst via estimating a catalyst gain based on the first and second exhaust gas sensors and modifying a reference air-fuel ratio offset based on the catalyst gain; and where during catalyst diagnostic conditions, the controller reverts to a predetermined catalyst gain and determines degradation of the catalyst based on the second exhaust gas sensor independent of the first exhaust gas sensor.

13. The system of claim 12, wherein the controller determines an adaptive gain based on the catalyst gain and modifies the offset based on the adaptive gain.

14. The system of claim 12, wherein the second exhaust gas sensor is positioned upstream relative to a portion of the catalyst.

15. The system of claim 12, wherein the catalyst comprises a plurality of catalyst elements and wherein the second exhaust gas sensor is positioned downstream relative to a first one of the plurality of catalyst elements.

16. The system of claim 12 wherein the catalyst comprises: a close-coupled catalyst positioned near an engine exhaust manifold; and an underbody catalyst positioned downstream relative to the close-coupled catalyst, wherein the second exhaust gas sensor is positioned between the close-coupled catalyst and the underbody catalyst.

17. The system of claim 12, wherein the first exhaust gas sensor provides a signal proportional to oxygen content of exhaust gas upstream of the catalyst.

18. The system of claim 17, wherein the first exhaust gas sensor comprises a universal exhaust gas oxygen sensor.

19. The system of claim 17, wherein the second exhaust gas sensor provides a signal indicative of a relative air-fuel ratio.

20. The system of claim 19, wherein the second exhaust gas sensor is a heated exhaust gas oxygen sensor.

* * * * *